J. F. O'CONNOR.
FRICTION GEAR FOR DRAFT RIGGINGS.
APPLICATION FILED MAR. 30, 1917.
1,252,937.
Patented Jan. 8, 1918.
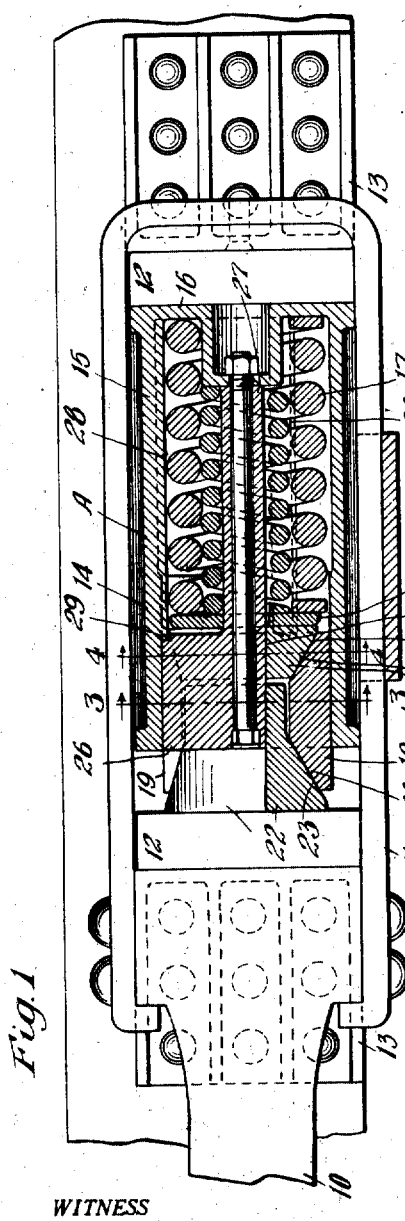
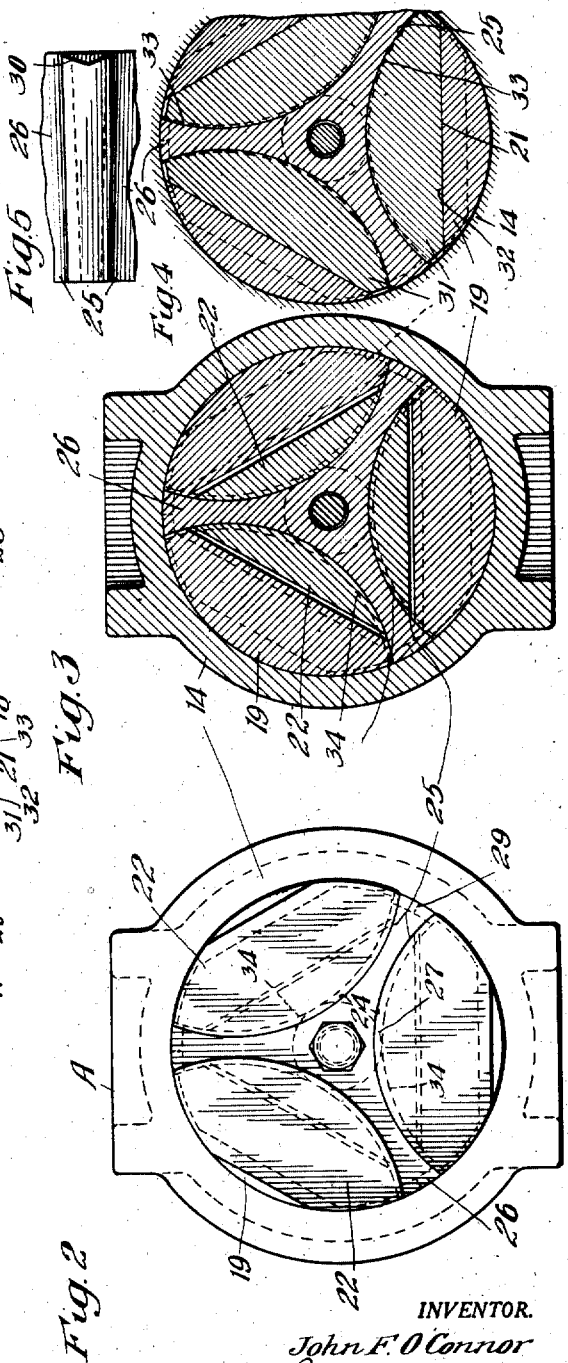
WITNESS
Wm. Geiger
INVENTOR.
John F. O'Connor
BY Geo. I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR FOR DRAFT-RIGGINGS.

1,252,937.  Specification of Letters Patent.  Patented Jan. 8, 1918.

Application filed March 30, 1917. Serial No. 158,497.

*To all whom it may concern:*

Be it known that I, JOHN F. O'CONNOR, a citizen of the United States, residing at Chicago, in the county of Cook and State of Illinois, have invented a certain new and useful Improvement in Friction-Gears for Draft-Riggings, of which the following is a full, clear, concise, and exact description, reference being had to the accompanying drawings, forming a part of this specification.

This invention relates to improvements in friction gears for draft riggings.

The object of this invention is to provide a shock absorbing mechanism of the friction type adapted for railway car draft riggings and other similar uses, and wherein are employed friction elements compactly arranged and so designed as to give maximum frictional areas.

Another and more specific object of the invention is to provide a shock absorber having a friction shell, with the interior surfaces of which coöperate friction shoes, and in addition, an inner friction post against which other friction elements bear, the last named elements and said post having maximum contacting friction surfaces.

In said drawing, Figure 1 is a part elevational view, part longitudinal section of a draft rigging showing my improvements adapted therefor. Fig. 2 is an end elevation of the shock absorbing mechanism or gear proper. Figs. 3 and 4 are sectional views taken on the lines 3—3 and 4—4 of Fig. 1. And Fig. 5 is a detail view illustrating more particularly the edge of one of the post wings.

In said drawing, the invention is shown in combination with a draw bar 10, yoke 11, followers 12—12 and stops 13—13 of a railway draft rigging.

Mounted between the followers 12—12 is a shock absorbing mechanism proper, and, as shown, comprises a casting A having a friction shell proper 14, spring casing 15 and rear integral follower 16. Mounted within the casting A is the main spring 17 preferably consisting of inner and outer nested coils, the latter bearing at their rear ends against the casting A and at their forward ends against a spring follower 18. Coöperable with the interior cylindrical surface of the shell proper 14, are three friction shoes 19—19, the latter having correspondingly shaped cylindrical outer surfaces. On their inner faces, each of the shoes 19 is provided with oppositely disposed wedge faces 20 and 21. Coöperable with the wedge surfaces 20 of the shoes are three combined wedges and friction shoes 22—22. Each of the members 22 is provided on its exterior with the wedge face 23 coöperating with the corresponding shoe wedge face 20. The inner faces of each of the members 22 correspond to the portion of a cylinder, as indicated at 24, and are adapted to coöperate with correspondingly formed friction surfaces 25 formed on a three-wing, centrally located friction post 26. The cross section of the post 26 is best illustrated in Fig. 3 and as there shown, there are three of said friction surfaces 25, equally spaced and regularly arranged with respect to the center of said post. The post 26 has a central extension 27 which bears against the rear end of the casting A to prevent said post from moving rearwardly, and as an additional means to prevent rearward movement of the post 26, the casting A is provided on its interior with three equally distant ribs 28 having their outer ends chamfered or of blunt wedge shape, as indicated at 29, to fit corresponding recesses 30 on the rear ends of the wings of the post 26. Not only are the wings of the post thus supported, but on account of the shape of the engagement between the ribs 28 and wings, the latter and the post 26 are prevented from relative rotation with respect to the casting A.

Coöperable with the inner ends of the friction shoes 19 are three additional combined wedges and friction shoes 31—31, each having a wedge surface 32 coöperable with the adjacent wedge surface 21 of the friction shoe. The spring follower 18 bears directly against the members 31 and resistance to the movement of the friction elements is transmitted from the spring 17 therethrough. Each of the members 31 is also provided on its inner face with a surface 33 corresponding to a portion of a cylinder and which coöperates with the adjacent corresponding friction surface 25 of the central post.

In order to increase the capacity of the gear and facilitate release, the friction surfaces 25 of the post are slightly tapered from the interior of the gear outwardly, as 11 appears from the dotted lines indicated at 34—34 in Figs. 2 and 3.

With the arrangement above described, it is apparent that I obtain a friction area between the friction shoes 19 and the shell substantially as great as that now obtained in a well known type of friction gear. In addition to this frictional area, I obtain the frictional area between the members 22 and 31 with the three-winged central post, and on account of the surfaces of the latter being curved as shown, and arranged substantially triangularly, as illustrated in Figs. 2 and 3, this area approaches a maximum, thus giving a friction gear wherein is obtained substantially double the frictional area normally obtained in friction gears of a similar type within substantially the same volume occupied by the friction shell and friction elements. Furthermore, by employing the wedge surfaces at the opposite ends of the friction shoes, the angle between the coöperating parts may be made relatively blunt which, in combination with the taper of the friction post, insures certain release. With my improvements, the wearing frictional surfaces are distributed over a larger area than the usual friction gears.

Although I have herein shown and described what I now consider the preferred means of carrying out the improvement, the same are merely illustrative and I contemplate all changes that come within the scope of the claims appended hereto.

I claim:

1. In a shock absorber, the combination with a friction shell having interior friction surfaces, of a friction post within the shell having exterior friction surfaces, friction shoes having wedge faces and coöperable with said friction surfaces of the shell and post, and spring means for resisting relative movement between said shoes and the shell and post, the friction surfaces of the shell and post being non-concentric.

2. In a shock absorber, the combination with a friction shell having interior friction surfaces, of a friction post within the shell having exterior friction surfaces, friction shoes having wedge faces and coöperable with said friction surfaces of the shell and post, and spring means for resisting relative movement between said shoes and the shell and post, the friction surface of the shell being curved on radii having their centers within the shell and the friction surfaces of the post being curved on radii having their centers exterior to the post.

3. In a shock absorber, the combination with a friction shell having interior friction surfaces, of a friction post within the shell having exterior friction surfaces, friction shoes having wedge faces and coöperable with said friction surfaces of the shell and post, and spring means for resisting relative movement between said shoes and the shell and post, the friction surface of the shell being cylindrical and the friction surfaces of the post being exteriorly concave.

4. In a shock absorber, the combination with a friction shell having an interior cylindrical friction surface, of a friction post disposed within the shell and having a series of outer concave friction surfaces facing the cylindrical friction surface of the shell, a spring, friction shoes engaging said friction surfaces, and means for wedging said shoes into engagement with said surfaces.

5. In a shock absorber, the combination with a friction shell having interior friction surfaces, of a friction post within the shell having exterior friction surfaces, friction shoes having wedge faces and coöperable with said friction surfaces of the shell and post, and spring means for resisting relative movement between said shoes and the shell and post, the surfaces of the post and shell being relatively slightly inclined toward each other from the outer to the inner end of the shell.

6. In a shock absorber, the combination with a friction shell having interior friction surfaces, of a friction post within the shell having exterior friction surfaces, friction shoes having wedge faces and coöperable with said friction surfaces of the shell and post, and spring means for resisting relative movement between said shoes and the shell and post, the friction surfaces of the post being inclined outwardly in a direction from the outer end of the shell toward the inner end thereof.

7. In a shock absorber, the combination with a friction shell having an interior friction surface, of a friction post located within the shell, said post having three substantially radially extending wings, a spring, friction shoes coöperable with the exterior surfaces of said post and the interior surface of the shell, and means for wedging said shoes into engagement with their respective friction surfaces.

8. In a shock absorber, the combination with a friction shell having interior friction surfaces, of a friction post disposed within the shell, said post having three substantially radially extending wings dividing the shell into three separate compartments, a plurality of friction shoes having coöperating wedge means therebetween in each of said compartments, and spring means for resisting relative movement between said shoes and the shell and post.

9. In a shock absorber, the combination with a friction shell having a cylindrical interior friction surface, of a member located within said shell and dividing the latter into three similar compartments, each of said compartments having opposed curved surfaces, friction shoes coöperable with each of the surfaces in each compartment, and spring means for resisting relative movement between said shoes and the shell and central member.

10. In a shock absorber, the combination with a friction shell having a cylindrical friction interior surface, of three friction shoes having exterior cylindrical friction surfaces coöperating with the interior shell surface, each of said shoes having oppositely arranged wedge faces on its interior, a centrally disposed friction post within the shell and having three regularly arranged cylindrical friction surfaces on its exterior, and inner and outer sets of combined friction shoes and wedges coöperable with the first named friction shoes, said combined friction shoes and wedges having interior cylindrical surfaces coöperating with the friction post.

In witness that I claim the foregoing I have hereunto subscribed my name this 12th day of March, 1917.

JOHN F. O'CONNOR.